United States Patent
Labinov et al.

(10) Patent No.: US 6,220,033 B1
(45) Date of Patent: Apr. 24, 2001

(54) UNIVERSAL THERMOCHEMICAL ENERGY CONVERTER

(75) Inventors: Solomon Davidovich Labinov; James R. Sand, both of Oak Ridge; James C. Conklin, Knoxville; James VanCoevering; George E. Courville, both of Oak Ridge, all of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/400,048

(22) Filed: Sep. 21, 1999

(51) Int. Cl.[7] ................................................. F01K 25/06
(52) U.S. Cl. ................................. 60/649; 60/650; 60/651
(58) Field of Search ............................ 60/650, 651, 671, 60/672, 649

(56) References Cited

U.S. PATENT DOCUMENTS

| | | | | |
|---|---|---|---|---|
| 4,166,362 | * | 9/1979 | Laurent | 60/651 X |
| 4,275,562 | * | 6/1981 | Fejer | 60/650 X |
| 4,439,988 | * | 4/1984 | Minardi et al. | 60/649 |
| 4,876,856 | * | 10/1989 | Iishiki et al. | 60/671 |
| 5,392,606 | * | 2/1995 | Labinov et al. | 60/673 |
| 5,816,048 | * | 10/1998 | Bronicki et al. | 60/651 X |

* cited by examiner

Primary Examiner—Hoang Nguyen
(74) Attorney, Agent, or Firm—Akerman, Senterfitt & Eidson, P.A.

(57) ABSTRACT

Disclosed are methods and apparatus for a thermochemical closed cycle employing a polyatomic, chemically active working fluid for converting heat energy into useful work.

16 Claims, 6 Drawing Sheets

UNIVERSAL THERMOCHEMICAL ENERGY CONVERTER

STATEMENT REGARDING FERDERALLY SPONSORED RESEARCH OR DEVELOPMENT

This invention was made with government support under Contract DE-AC05-96OR22464, awarded by the United States Department of Energy to Lockheed Martin Energy Research Corporation, and the United States Government has certain rights in this invention.

CROSS-REFERENCE TO RELATED APPLICATIONS

Not applicable.

BACKGROUND OF THE INVENTION

Modern heat engines with open working cycles, such as diesel engines, auto engines and gas turbines, are internal combustion engines. Internal combustion engines use air as the working fluid and oxidize the fuel fed to the engine as a source of heat. Gases that form as a result of fuel combustion must not contain solid combustion products because solid contaminants are detrimental to the mechanical systems used for the engine. To avoid the problems associated with solid contaminants, gaseous or liquid light hydrocarbons are employed as fuels in internal combustion engines. Attempts to use solid substances as fuel for these engines have proven unsuccessful because it is extremely difficult to remove solid particles from the combustion gases. Changing the solid fuel to a combustible gas using gasifiers results in additional complexity and loss of efficiency. Gasification also increases size, weight and cost of the equipment.

Many rural regions of the world are not served by public or quasi-public utility energy suppliers of electricity and fuel gas. In some cases these needs are presently served by portable internal combustion engine generator units fueled by highly refined liquid fuels. However, the availability and cost of these fuels may limit the use and economy of such generator units. Since internal combustion engines require a clean burning fuel source for compatability with precisely machined mechanisms, they cannot be operated directly using fuel sources such as wood, biomass, solar and geothermal energy, which are generally inexpensive and available worldwide.

External combustion closed cycle engines that use air as the working fluid have been developed in order to burn solid fuel external to the cycle. Air was selected as the working fluid because it is available and benign. Closed cycle engines using air as the working fluid have met with only limited success because air has a low heat transfer coefficient and because heat exchangers that use air are generally large in size and have significant parasitic pressure losses. Other inert working fluids have been used with limited success.

U.S. Pat. No. 5,392,606, which is incorporated by reference herein, discloses a closed circulation system for a chemically active working fluid with improved efficiency over earlier closed systems. In the thermochemical converter described in U.S. Pat. No. 5,392,606, a chemically active working fluid having a relatively large molecular weight is pressurized in a compressor such that the temperature of the working fluid and the pressure of the working fluid increases. The working fluid is further heated in a recuperator with the heat of the turbine exhaust gases, and after the recuperator, is heated in a heater with heat from an external combustion chamber to the maximum temperature of the cycle. This heating results in chemical dissociation to form a mixture of lower molecular weight components. The working fluid is introduced to a turbine where it undergoes adiabatic expansion to the lower pressure cycle and provide shaft work. The working fluid then goes to the recuperative heat exchanger where it is cooled and partially recombined, releasing heat to the high pressure flow on the other side of the recuperator. The working fluid the goes to a boiler, where cooling and recombination of the active working fluid continues with the release of sensible heat from cooling gases and chemical reaction heat from recombination of the working fluid. This heating causes evaporation of water in the boiler. After the boiler, the boiler fluid passes through a condenser and through a throttle to an evaporator, where it is evaporated with the absorption of heat (cooling effect) and enters the compressor.

The thermochemical converter of U.S. Pat. No. 5,392,606 represents an improvement over closed cycle systems that use conventional working fluids. However, there is a strong demand within the industry and among consumers for further improvements to thermochemical converters to increase efficiency for power generation of general applicability.

BRIEF SUMMARY OF THE INVENTION

It is an object of the present invention to provide a method and an apparatus for producing usable energy forms such as electrical, rotary mechanical, space or water heating, comfort cooling, or refrigeration that is inexpensively adaptable to any type of solid, liquid, or gaseous fuel source including biomass, geothermal, solar, and nuclear sources.

The present invention includes a method of transforming heat energy to useful work comprising the steps of providing a closed circulation system for a working fluid, the system including a prime mover, a compressor, and at least one recuperative heat exchanger; charging said closed circulation system with a polyatomic working fluid having the cyclic property of at least partial dissociation from the gaseous state of a first molecular structure to the gaseous state of a second, less complex molecular structure and recombination; compressing the gaseous phase of said working fluid in said compressor; delivering the compressed working fluid to a first recuperative heat exchanger and heating the working fluid to achieve at least partial dissociation; delivering the working fluid to a second heat exchanger in thermal contact with an external heat source and heating the working fluid to cause further dissociation and increasing the temperature; delivering the working fluid from the second heat exchanger to a prime mover turbine, expanding the working fluid and partially recombining the working fluid in an exothermic reaction; delivering the working fluid to the first recuperative heat exchanger where it is cooled and undergoes further recombination; delivering the partially recombined working fluid to an air heat exchanger where it undergoes further cooling and recombination as heat is transferred from the working fluid to air, which heated air is delivered to the external heat source; and completing the cycle by delivering the working fluid to a compressor and repeating the cycle.

The present invention serves the object of providing a highly efficient method for converting heat energy from a wide variety of sources to useful work.

It is an advantage of the present invention that this system can be used in a relatively small energy generation station that can be fueled with a variety of readily available fuel sources including biomass, solar, and nuclear fuel sources.

Other objects, features, and advantages of the present invention will become apparent upon review of the figures specification and claims.

DETAILED DESCRIPTION OF THE INVENTION

The method and apparatus of the present invention provide a closed working cycle that allows the efficient conversion of externally supplied heat to useful work or energy forms, including rotary mechanical (shaft) energy (electrical, space or water heating, comfort cooling, and refrigeration.

Because the thermochemical converter employs an external heat source, it is adaptable for use with any of a variety of energy sources, including, but not limited to, solar, biomass, geothermal, and nuclear sources. It is expected that any heat source may be used in the thermochemical converter of the present invention.

The thermochemical converter of the invention may have advantages resulting from the synergistic effects that occur as a result of interactions between thermodynamic and chemical processes in the flow of a working fluid. These effects lower the work of compression, increase the work of expansion, and increase heat transfer intensity in flows employing a chemically active working fluid.

The method and apparatus of the invention employs a chemically active working fluid characterized by its ability to cycle between a relatively high molecular weight molecular structure in a gaseous state and a relatively low molecular weight elemental or molecular structure in a gaseous state. The higher molecular weight structure is converted to a lower molecular weight structure as a result of endothermic dissociation, and the lower molecular weight structure can undergo exothermic recombination to form the original higher molecular weight structure.

The working fluid of the present invention may include a single polyatomic compound, or the working fluid may include a polyatomic compound mixed with inert materials such as air at varying concentrations. The working fluid may also include a mixture of two or more polyatomic compounds. Examples of suitable polyatomic compounds for use in the method of the invention are provided in Table 1.

Figure 1:
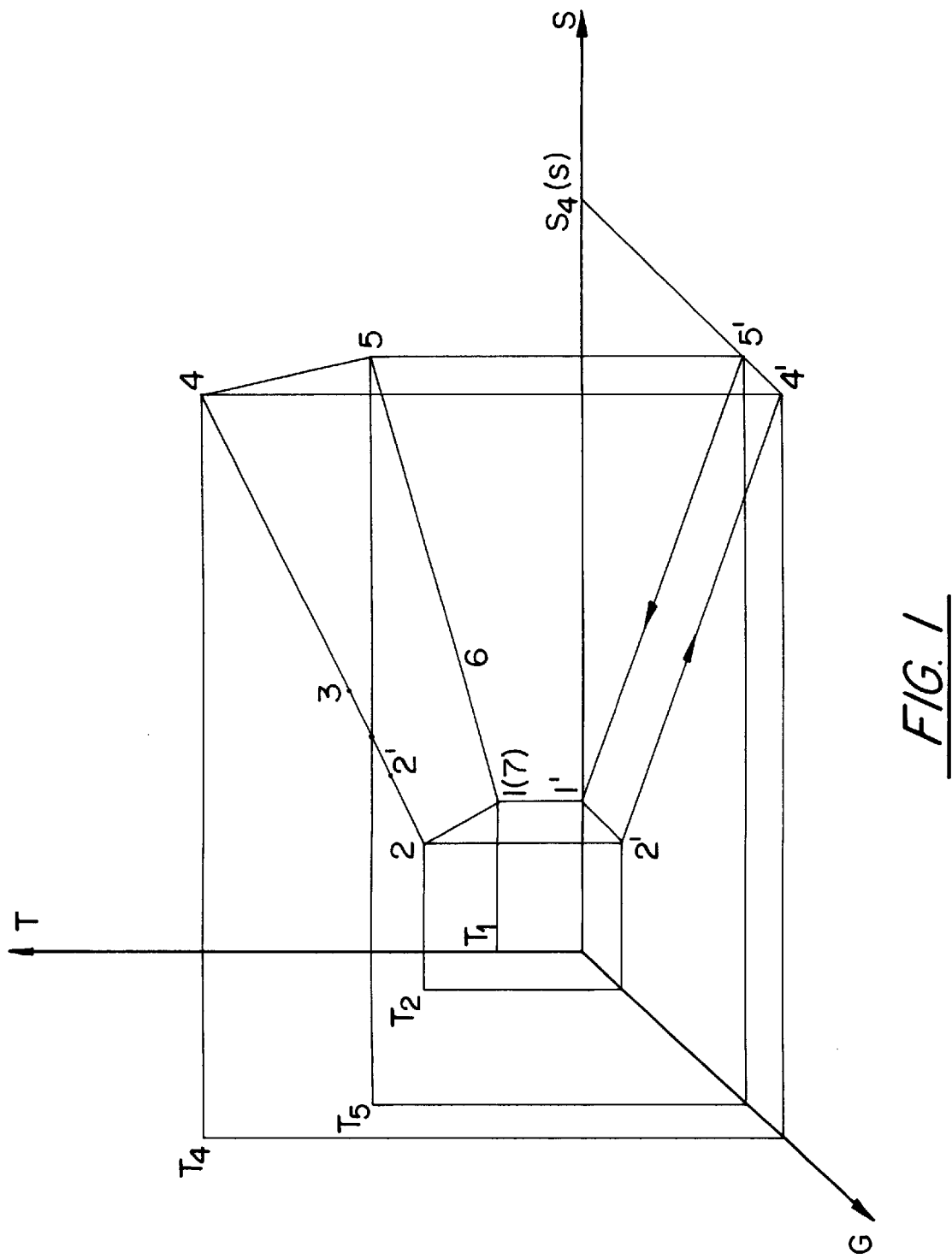
FIG. 1 is a temperature-entropy-free energy diagram of a closed thermochemical cycle with one stage compression and one stage expansion of a chemically active working fluid.
Figure 2:
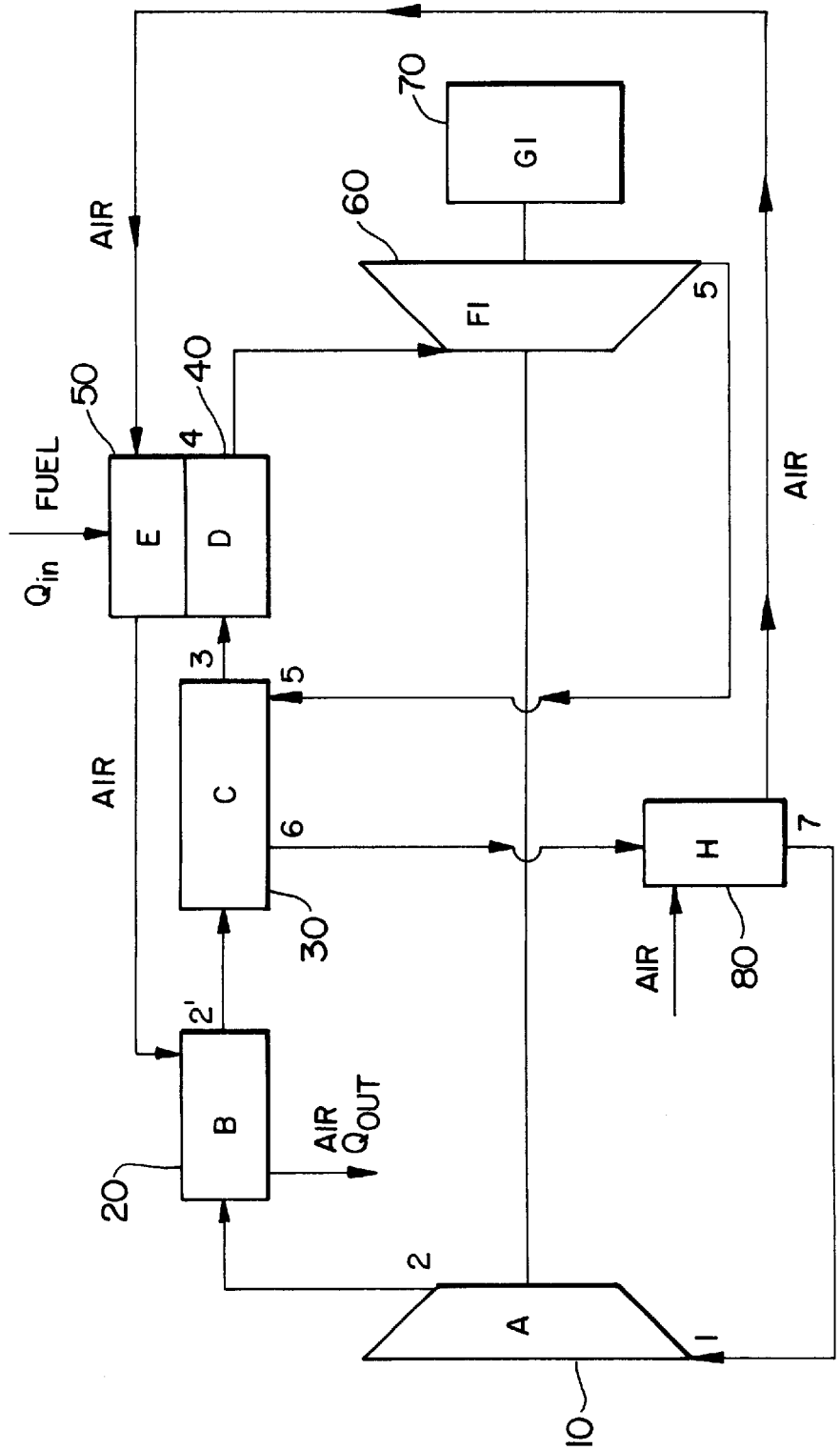
FIG. 2 is a fluid and process flow schematic of the closed thermochemical cycle corresponding to FIG. 1.

With reference to FIGS. 1 and 2, the lowest energy state of the thermodynamic cycle is found at state point 1, which corresponds to a higher molecular weight structure (e.g., $N_2O_4$) in a gaseous state. The working fluid is compressed by a compressor 10, and is energized and partially dissociated to form lower molecular weight structures (e.g., $NO_2$) at state point 2. From state point 2 to state point 2', the working fluid is heated across a recuperative heat exchanger 20 by heat exchange with waste heat from the external heat source 50, which causes further dissociation. From state point 2' to state point 3, the working fluid is heated across a second recuperative heat exchanger 30 by the exhaust from the prime mover 60 and is further dissociated. The working fluid passes from state point 3 to state point 4 through a heater 40 in thermal contact with an external heat source 50 (which may include a combustion chamber) to complete the dissociation reaction and add heat at a high temperature for high efficiency. The flow enters the turbine 60 and expands to point 5 to produce shaft work. The shaft work can be used to drive the compressor 10 and to generate electricity through an

TABLE 1

| No. | Stoichiometric formula |
|---|---|
| 1 | $N_2O_4 - 2NO + O_2$ |
| 2 | $N_2O_4 - 2NO_2$ |
| 3 | $C_6H_{12} - C_6H_6 + 3H_2$ |
| 4 | $2SO_3 - 2SO_2 + O_2$ |
| 5 | $CH_3OH - CO + 2H_2$ |
| 6 | $2NH_3 - N_2 + 3H_2$ |
| 7 | $C_2H_6 - C_2H_4 + H_2$ |
| 8 | $C_{10}H_{18} - C_{10}H_8 + 5H_2$ |
| 9 | $C_7H_{14} - C_7H_8 + 3H_2$ |
| 10 | $C_{10}H_{12} - C_{10}H_8 + 2H_2$ |
| 11 | $C_4H_{10} - C_4H_6 + 2H_2$ |
| 12 | $C_2H_5OH - CH_3COH + H_2$ |
| 13 | $C_6H_{11}OH - C_6H_5OH + 3H_2$ |
| 14 | $C_5H_{10}NH - C_5NH_5 + 3H_2$ |
| 15 | $i-C_3H_7OH - (CH_3)_2CO + H_2$ |
| 16 | $CH_3OH - CH_2O + H_2$ |
| 17 | $NH_4HSO_4 - NH_3 + SO_3 + H_2O$ |
| 18 | $CH_4 + H_2O - CO + 3H_2$ |
| 19 | $CH_4 + CO_2 - 2CO + 2H_2$ |
| 20 | $HCONH_2 - CO + NH_3$ | electric generator 70, or for other uses such as pumping water. During the expansion process, partial exothermic recombination of the working fluid occurs, and the temperature at the end of the expansion process is higher than that resulting from the expansion of a conventional working fluid. The working fluid passes from the prime mover 60 to the recuperative heat exchanger 30 where it is cooled under constant pressure from point 5 to point 6. Further exothermic recombination of the working fluid occurs in the process of isobaric cooling. In this manner, the exchange of energy between the chemically dissociating working fluid (2'->3) and chemically recombining working fluid (5 ->6) occurs at the recuperator 30 thus transferring energy from the exothermic process of recombination to the endothermic dissociation process internal to the cycle. From point 6 to point 7 the working fluid is cooled in an air heat exchanger 80. The heated air flows from the heat exchanger 80 to the external heat source 50 to further improve the cycle efficiency. From point 7 to point 1, the cooled, recombined working fluid is passed from the heat exchanger 80 to the compressor 10, and the cycle is repeated.

The external heater 50 may be any suitable heater, including a combustion chamber fueled by traditional energy carrier such as coal or oil. However, the external heater may also be a solar furnace, nuclear heat cell, biomass furnace, or geothermal exchange. By whatever means energy conversion takes place at external heater 50, the working fluid is heated to the highest temperature of the cycle at state point 4, which is the highest energy of the cycle. Over this 3–4 state point increment of the cycle, the working fluid is partially or wholly dissociated to lower molecular weight constituents. The potential for work produced by the turbine is therefore enhanced as the gas expands from state point 4 to state point 5. Representative uses of the work produced at turbine 60 are to drive the compressor 10, to drive an electric dynamo 70, or to provide mechanical shaft work, such as pumping water. By "dynamo" it is meant any form of electric power generation device, including but not limited to, generators and alternators.

Figure 3:
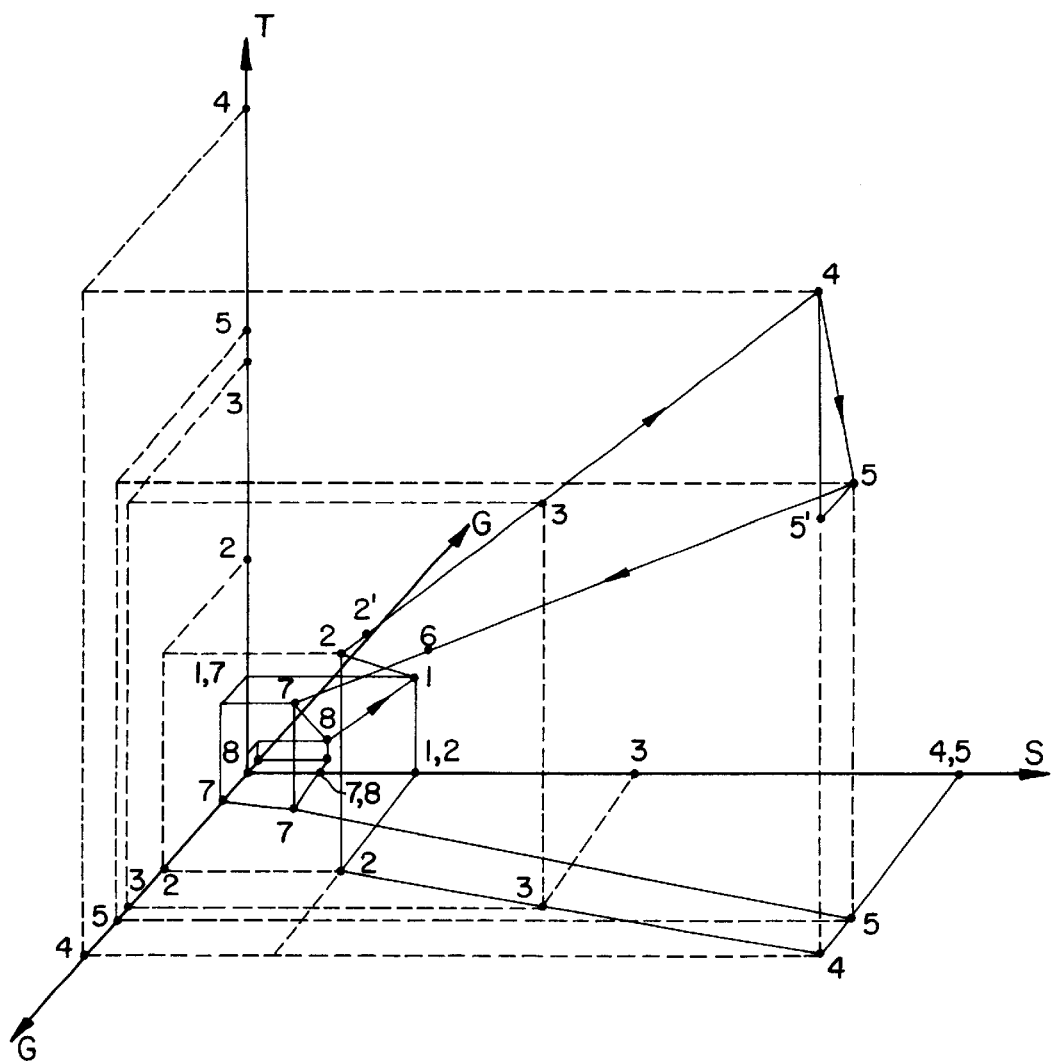
FIG. 3 is a temperature-entropy-free energy diagram of a closed thermochemical cycle with one stage compression and two stage expansion of a working fluid in the thermochemical cycle.
Figure 4:
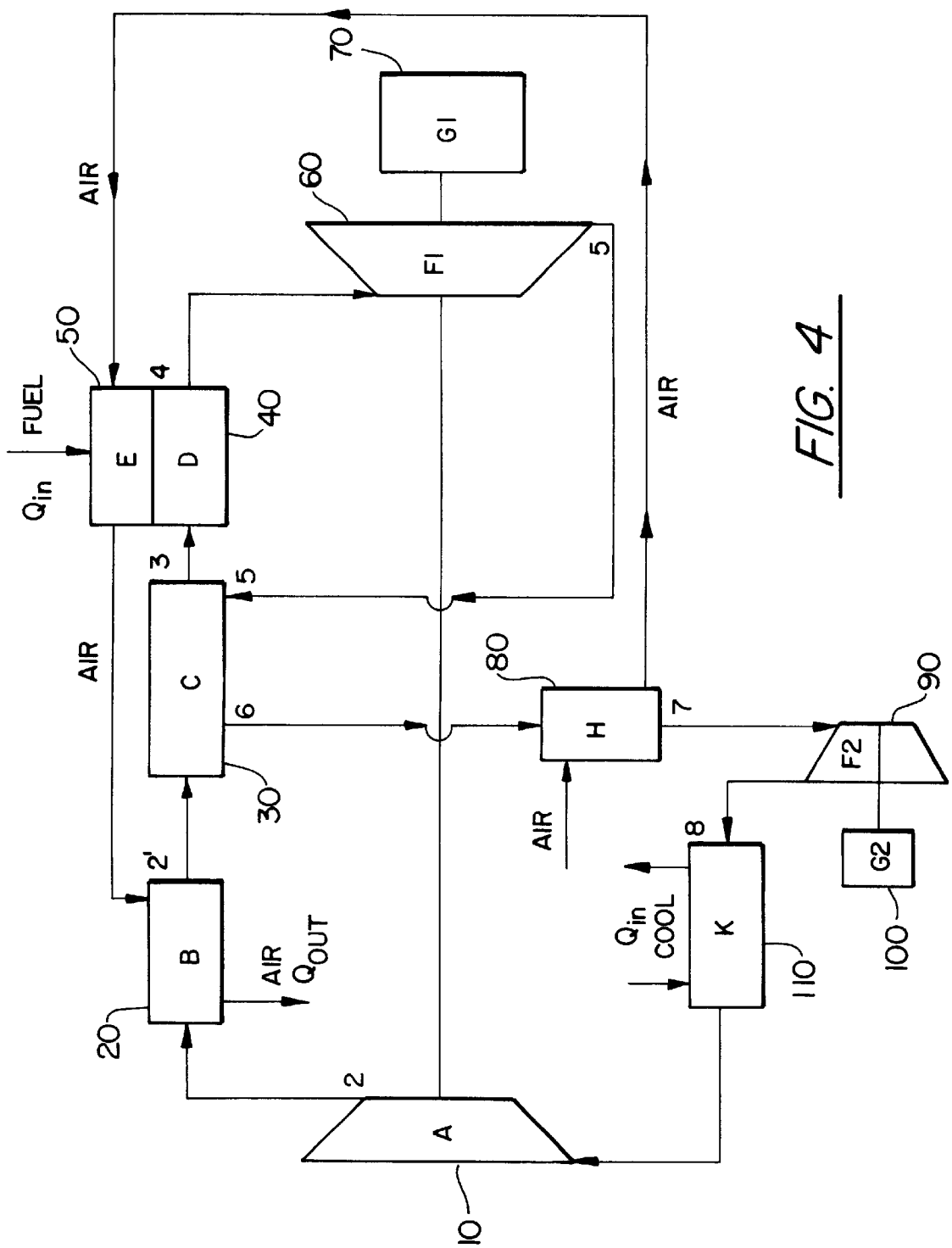
FIG. 4 is a fluid and process flow schematic of the thermochemical cycle corresponding to FIG. 3.

Another embodiment of the present invention, as shown in FIG. 3 and 4, is a method and apparatus for the production of electricity and refrigeration based on a thermochemical cycle in which a working fluid undergoes a one stage compression and a two stage expansion. State point 1 through state point 7 of the system shown in FIG. 4 are essentially the same as the corresponding state points of in FIG. 2. After passing through the air heat exchanger at point 7, the cooled, partially recombined working fluid undergoes a second expansion stage at the turbine 90 from point 7 to point 8. The exothermic process of recombination is completed at the second stage of the turbine. The work of expansion can be used to drive a second dynamo or provide shaft power to the compressor or a dynamo 100 or for other uses. At point 8, the pressure of the working fluid is the lowest pressure of the cycle, and the temperature is lower than the temperature at the beginning of the compression process at point 1. The working fluid is then heated by an air heat exchanger 110 that takes heat from the environment, and thus, provides cooling.

Figure 5:
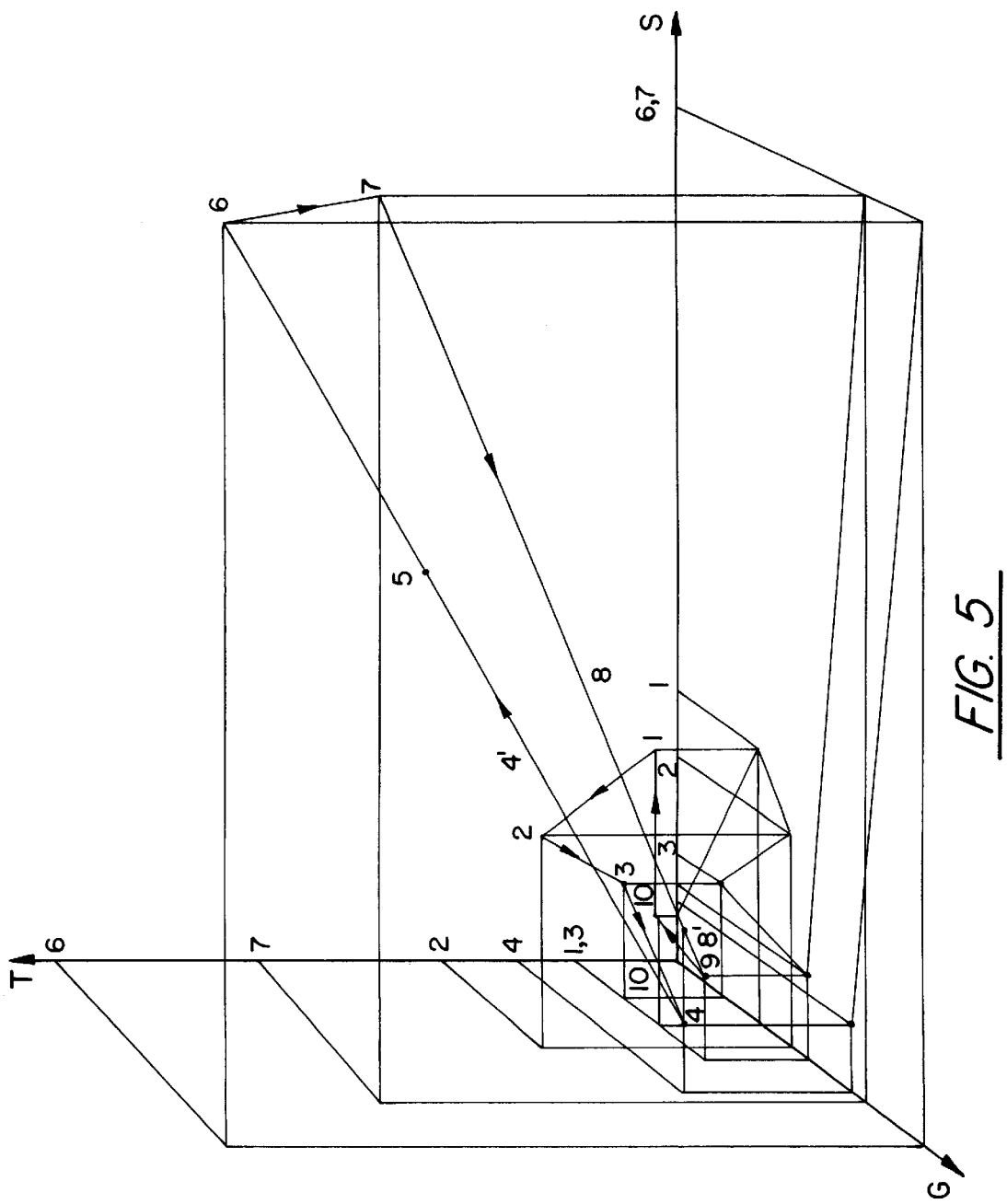
FIG. 5 is a temperature-entropy-free energy diagram of a two stage compression and two stage expansion thermochemical cycle.
Figure 6:
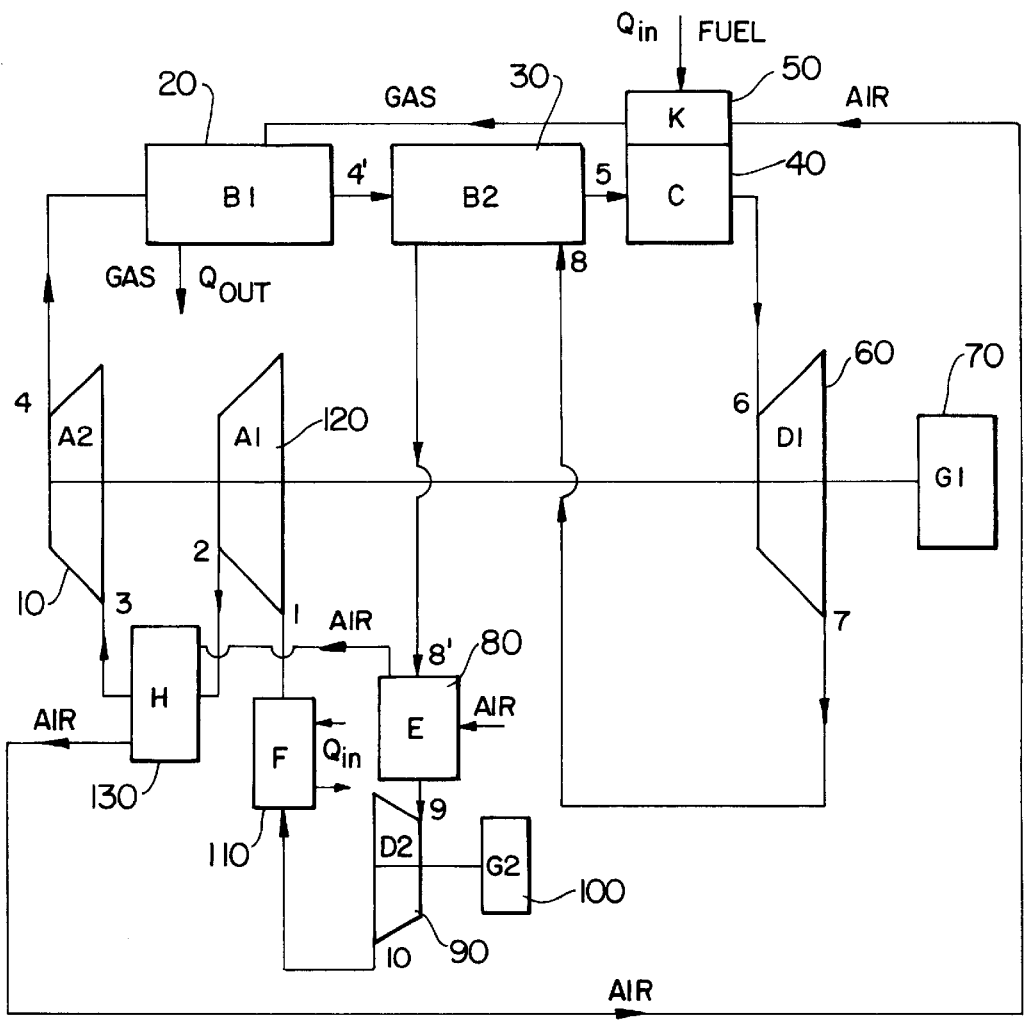
FIG. 6 is a fluid and process flow schematic of a thermochemical cycle corresponding to FIG. 5.

The thermochemical system shown in FIG. 5 and FIG. 6 is a modification of the system of FIG. 4 and includes a two-stage compression and two-stage expansion, which allows lower refrigeration temperatures to be obtained. The chemically active working fluid is compressed from point 1 to point 2 in the first compressor 120. From point 2 to point 3, the working fluid is cooled by an air heat exchanger or intercooler 130 at which heat is transferred from the working fluid to air. The heated air from the intercooler 130 flows to the external heater 50 to further improve cycle efficiency. The cooled working fluid is delivered to a second compressor 10 where it undergoes compression from point 3 to point 4.

As a result of the cooling that takes place between the two compression stages, the total pressure ratio of the system of FIG. 6 is equal to that of FIG. 4, and the working fluid temperature at state point 4 of FIG. 6 is lower than the working fluid temperature state point 2 of FIG. 4. This lower compressor discharge temperature allows an increase in internal cycle heat regeneration and a decrease in working fluid temperature at the inlet to the second stage of the turbine and a decrease in the work required to raise the gas to a higher pressure. The working fluid temperature at the outlet of the second stage of the turbine is lower than the corresponding temperature at corresponding state of the system of FIG. 4, which results in a higher cycle cooling effect at a lower temperature.

With continued reference to FIG. 6, the remainder of the cycle is essentially the same as that shown in FIG. 4, with the working fluid being heated from point 4 to point 6 through a series of heat exchangers, and expanded from point 6 to point 7 in an exothermic recombination reaction. The heat from this recombination reaction from point 8 to point 8' is used to promote dissociation of the working fluid in the top cycle from point 4 to point 5. From point 8' to point 9, the working fluid is cooled in an air heat exchanger 80 by transferring heat to air, which is then delivered to heat exchanger 130. The cooled working fluid at state point 9 undergoes expansion in a turbine 90 that is mechanically connected to a dynamo 100 or to provide external mechanical shaft work. The working fluid passes from state point 10 to state point 1 through a heat exchanger 110 in which heat is transferred from the ambient atmosphere to the working fluid as the working fluid moves from state point 10 to state point 1 and the cycle is repeated.

The present invention is not limited to the exemplified embodiments, but is intended to encompass all such modification and variation as come within the scope of the following claims.

We Claim:

1. A method of transforming heat energy to useful work comprising the steps of:
   (a) providing a closed circulation system for a working fluid, the system comprising a prime mover, a compressor and at least one recuperative heat exchanger;
   (b) charging the system of step (a) with a polyatomic working fluid characterized by the cyclic property of at least partial dissociation from a first higher molecular weight molecular structure in the gaseous state to at least one second lower molecular weight molecular structure in a gaseous state, and reassociation of the second lower molecular weight molecular structure to form the first heigher molecular weight molecular structure;
   (c) compressing a gaseous state of the working fluid of step (b), so as to cause the working fluid at least partially dissociate in an endothermic reaction;
   (d) delivering the compressed partially dissociated working fluid to a recuperative heat exchanger and heating the working fluid with the exit flow from the prime mover and with waste heat from external combustion gases such that the working fluid undergoes further dissociation;
   (e) delivering the working fluid to a heat exchanger in thermal contact with an external heater and heating the working fluid so as to cause further dissociation;
   (f) delivering the working fluid from the heat exchanger of step (e) to a prime mover expanding the working fluid and partially recombining the working fluid in an exothermic reaction;
   (g) delivering the working fluid from the prime mover to the heat exchanger of step (d), cooling the working fluid under constant pressure and allowing exothermic recombination of the working fluid;
   (h) delivering the working fluid of step (g) from the heat exchanger to an air heat exchanger and allowing the transfer of heat from the working fluid to air, and delivering the heated air to the external combustion chamber; and
   (i) delivering the working fluid from the air heat exchanger to the compressor.

2. The method of claim 1, wherein the prime mover is operably connected to a generator or alternator or a shaft that provides mechanical work.

3. The method of claim 1, after step (h) and before step (i) further comprising the steps of:
   (j) delivering the working fluid from the air heat exchanger of step (h) to a second prime mover, and allowing the working fluid to expand and undergo exothermic recombination;

(k) delivering the working fluid from the second prime mover of step (j) to a second air heat exchanger in thermal contact with environment and allowing the working fluid to be heated by the environment and delivering the working fluid from the second air heat exchanger to the compressor.

4. Method of claim 3 wherein the second turbo prime mover is operably connected to a generator or an alternator or to a shaft that provides mechanical work.

5. A method of transforming heat energy to useful work comprising the steps of:

(a) providing a closed circulation system for a working fluid, the system comprising a prime mover, two compressors, and at least one recuperative heat exchanger; and (b) charging the system of step (a) with a polyatomic working fluid characterized by the cyclic property of at least partial dissociation from a first higher molecular weight molecular structure in the gaseous state to at least one second lower molecular weight molecular structure in a gaseous state, and reassociation of the second lower molecular weight molecular structure to form the first heigh molecular weight molecular structure;

(c) compressing a gaseous state of the working fluid of step (b) in a first compressor and compressing the working fluid;

(d) transferring the working fluid from the first compressor to an air heat exchanger, allowing heat to transfer from the working fluid to the air, delivering the heated air to an external heater, and delivering the cooled working fluid from the air heat exchanger to a second compressor;

(e) delivering the compressed working fluid from the second compressor to a recuperative heat exchanger, heating the working fluid at constant pressure with the exit flow from the prime mover and with waste heat from external combustion gases such that the working fluid undergoes at least partial dissociation;

(f) delivering the working fluid to a heat exchanger in thermal contact with an external heater and heating the working fluid so as to cause further dissociation and an increase in temperature;

(g) delivering the working fluid from the second recuperative heat exchanger to a prime mover, expanding the working fluid, and partially recombining the working fluid in an exothermic reaction;

(h) delivering the working fluid from the prime mover turbine to the recuperative heat exchanger of step (e), cooling the working fluid;

(i) delivering the working fluid from the recuperative heat exchanger to an air heat exchanger and allowing the transfer of heat from the working fluid to air, delivering the heated air to a second air heat exchanger, and delivering the cooled working fluid to a second prime mover;

(j) delivering the working fluid from the air heat exchanger to a second prime mover expanding the working fluid, and allowing exothermic recombination to take place;

(k) delivering the working fluid from the prime mover of step (j) to a air heat exchanger in thermal contact with the environment, and allowing the working fluid to be heated; and (l) delivering the heated working fluid from step (k) to the first compressor of step (c).

6. Method of claim 5 wherein the second turbo prime mover is operably connected to a generator or an alternator or a shaft that provides mechanical work.

7. A system for transforming heat energy to useful work comprising a compressor, at least one top cycle recuperative heat exchanger, a heater, a prime mover, and at least one bottom cycle heat exchanger all connected by a closed fluid conduit means; and a polyatomic working fluid within the conduit means, the working fluid having the cyclic property of at least partial dissociation from the gaseous state of a first, higher molecular weight polyatomic structure to the gaseous state of at least one lower molecular weight elemental or molecular structure, and recombination, wherein the working fluid undergoes at least one selected from the group consisting of at least partial dissociation during a compression cycle, at least partial dissociation during heating in the recuperative heat exchanger, and at least partial recombination during an expansion cycle.

8. The system of claim 7, wherein a second prime mover and a second bottom cycle heat exchanger are connected by the fluid conduit means between the first bottom cycle heat exchanger and the first compressor.

9. The system of claim 7, wherein a second prime mover, a second bottom cycle heat exchanger, a second compressor, and a third bottom cycle heat exchanger are connected by the fluid conduit means between the first bottom cycle heat exchanger and the first compressor.

10. The system of claim 7, wherein said working fluid has the cyclic property of at least partial dissociation from the gaseous state of a first, higher molecular weight polyatomic structure to the gaseous state of two lower molecular weight elemental or molecular structures.

11. A method of transforming heat energy comprising the steps of:

(a) providing a closed circulation system having a polyatomic working fluid characterized by the cyclic property of at least partial dissociation from a first higher molecular weight molecular structure in the gaseous state to at least one second lower molecular weight molecular structure in a gaseous state, and reassociation of the second lower molecular weight molecular structure to form the first higher molecular weight molecular structure;

(b) compressing the working fluid to cause the working fluid to at least partially dissociate in an endothermic reaction;

(c) heating the working fluid to cause further dissociation of the working fluid;

(d) expanding the working fluid and partially recombining the working fluid in an exothermic reaction; and (e) cooling the working fluid under substantially constant pressure, wherein the working fluid cools allowing exothermic recombination of the working fluid.

12. The method of claim 11, wherein the working fluid is heated at least in part with heat from an exit flow from a prime mover turbine.

13. The method of claim 11, wherein the working fluid is heated at least in part with heat from an exit flow from a prime mover turbine and waste heat from external combustion gases.

14. The method of claim 11, wherein said working fluid has the cyclic property of at least partial dissociation from the gaseous state of a first, higher molecular weigbt polyatomic structure to the gaseous state of two lower molecular weight elemental or molecular structures.

15. A method of thermochemical energy conversion using a polyatomic working fluid characterized by the cyclic property of at least partial dissociation from a first higher molecular weight molecular structure in the gaseous state to at least one second lower molecular weight molecular structure in a gaseous state, and reassociation of the second lower molecular weight molecular structure to form the first higher molecular weight molecular structure, comprising the steps of:

at least one selected from the group consisting of compressing the working fluid causing the working fluid to at least partially dissociate in an endothermic reaction during a compression step, dissociating said working fluid at least partially during heating in a heat exchange step, and recombining the working fluid at least partially during an expansion step.

16. The method of claim 15, wherein said working fluid has the cyclic property of at least partial dissociation from the gaseous state of a first, higher molecular weight polyatomic structure to the gaseous state of two lower molecular weight elemental or molecular structures.

* * * * *